(12) United States Patent
Wang et al.

(10) Patent No.: US 8,761,259 B2
(45) Date of Patent: Jun. 24, 2014

(54) MULTI-DIMENSIONAL NEIGHBORING BLOCK PREDICTION FOR VIDEO ENCODING

(75) Inventors: Kai Wang, San Diego, CA (US); Narendranath Malayath, San Diego, CA (US); Raghavendra C. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1957 days.

(21) Appl. No.: 11/533,745

(22) Filed: Sep. 20, 2006

(65) Prior Publication Data

US 2007/0110160 A1     May 17, 2007

Related U.S. Application Data

(60) Provisional application No. 60/719,891, filed on Sep. 22, 2005.

(51) Int. Cl.
*H04B 1/66*     (2006.01)
*H04N 7/12*     (2006.01)
*H04N 11/02*     (2006.01)
*H04N 11/04*     (2006.01)

(52) U.S. Cl.
USPC .................................................. 375/240.16

(58) Field of Classification Search
None
See application file for complete search history.

(56) References Cited

U.S. PATENT DOCUMENTS

| | | | |
|---|---|---|---|
| 5,414,469 A | 5/1995 | Gonzales et al. | |
| 5,652,625 A | 7/1997 | Chen et al. | |
| 5,818,536 A | 10/1998 | Morris et al. | |
| 6,023,296 A | 2/2000 | Lee et al. | |
| 6,418,166 B1 | 7/2002 | Wu et al. | |
| 6,690,833 B1 | 2/2004 | Chiang et al. | |

(Continued)

FOREIGN PATENT DOCUMENTS

| | | |
|---|---|---|
| CN | 1272031 | 11/2000 |
| JP | 10023413 | 1/1998 |

(Continued)

OTHER PUBLICATIONS

Chuan-Yu Cho et al., "An embedded merging scheme for H.264/AVC motion estimation," Proceedings 2003 International Conference on Image Processing. ICIP-2003. Sep. 14, 2003, pp. 909-912, vol. 2 of 3, IEEE, US.

(Continued)

*Primary Examiner* — Mehrdad Dastouri
*Assistant Examiner* — Kristin Dobbs
(74) *Attorney, Agent, or Firm* — Espartaco Diaz Hidalgo

(57) ABSTRACT

The motion estimation techniques and video encoding device (s) described use a two dimensional pipeline to generate accurate motion estimation parameters for a current video block. The two dimensional pipeline uses previously calculated motion estimation parameters of relevant neighboring video blocks, including a preceding video block on a same row as the current video block, prior to the generation of the accurate motion vectors, motion vector predictors, and mode decision of the current video block. The use of the two dimensional pipeline allows accurate motion vector prediction from neighboring video blocks previously not available, in the computation of motion vectors. Three engines may be used in the two dimensional pipeline, a fetch engine, an integer search engine and a fractional and spatial search engine. While the fetch engine and fraction and spatial search engine operate on one row, the integer search engine operates on another row.

28 Claims, 6 Drawing Sheets

(56) References Cited

U.S. PATENT DOCUMENTS

| | | | |
|---|---|---|---|
| 7,372,903 | B1 | 5/2008 | Lee et al. |
| 7,394,853 | B2 | 7/2008 | Kondo et al. |
| 7,555,044 | B2 * | 6/2009 | Wang et al. ............ 375/240.18 |
| 2003/0231712 | A1 | 12/2003 | Malayath et al. |
| 2004/0028133 | A1 * | 2/2004 | Subramaniyan et al. 375/240.16 |
| 2006/0018552 | A1 | 1/2006 | Malayath et al. |
| 2006/0023788 | A1 | 2/2006 | Otsuka et al. |
| 2006/0120612 | A1 | 6/2006 | Manjunath et al. |
| 2006/0222075 | A1 * | 10/2006 | Zhang et al. ............ 375/240.16 |
| 2007/0092006 | A1 | 4/2007 | Malayath |
| 2007/0183500 | A1 | 8/2007 | Nagaraj et al. |

FOREIGN PATENT DOCUMENTS

| | | |
|---|---|---|
| JP | 10510132 | 9/1998 |
| JP | 2001510311 | 7/2001 |
| JP | 2004501582 | 1/2004 |
| JP | 2005142606 | 6/2005 |
| JP | 2005198289 | 7/2005 |
| JP | 2005244503 | 9/2005 |
| JP | 2005295526 | 10/2005 |
| WO | WO0199437 A2 | 12/2001 |

OTHER PUBLICATIONS

Huang Shih-Yu et al., "A simple and efficient block motion estimation algorithm based on full-search array architecture," Signal Processing. Image Communication, Elsevier Science Publishers, Amsterdam, NL, vol. 19, No. 10, Nov. 2004, pp. 975-992.

Yanfei Shen et al., "Fast mode selection based on texture analysis and local motion activity in H.264/JVT," Communications, Circuits and Systems, 2004. ICCCAS 2004. 2004 International Conference on Chengdu, China Jun. 27-29, 2004, Piscataway, JJ, USA, IEEE, US, Jun. 27, 2004, pp. 539-542, vol. 1.

Schiefer P., "A novel VLSI-architecture for motion-estimation: the picture processing RAM," Circuits and Systems, 1992., Proceedings of the 35th Midwest Symposium on Washington, DC, USA Aug. 9-12, 19921, New York, NY, USA, IEEE, US, Aug. 9, 1992, pp. 536-539.

ITU-T Recommendation H.264, Advanced Video Coding for Generic Audiovisual Services. Section 8.4. Mar. 2005.

Wiegand T., et al., "Rate-constrained coder control and Comparison of video coding standards", IEEE Trans. Circuits Syst. Video Technol., vol. 13, pp. 688-702, Jul. 2003.

Coban, Muhammed Z., et al. "Fast-Rate-Constrained N-Step Search Algorithm for Motion Estimation". School of Electrical & Computer Engineering, George Institute of Technology. Atlanta, GA. IEEE 1998. pp. 2613-2616.

International Search Report and Written Opinion—PCT/US2006/037130, International Search Authority—European Patent Office—Mar. 20, 2007.

Kossentini, et al., "Predictive RD Optimized Motion Estimation for Very Low Bit-Rate Video Coding," IEEE Journal on Selected Areas in Communications, IEEE Service Center, Piscataway, NJ, US, vol. 15, No. 9, Dec. 1997, 1752-1763, ISSN: 0733-8716.

Wiegand, Thomas, et al. "Long-Term Memory Motion-Compensated Prediction". IEEE vol. 9, No. 1. Feb. 1999. pp. 70-84.

Yang, Yan, et al. "Rate-Distortion-Based Combined Motion Estimation and Segmentation", School of Electrical Engineering. Cornell University. Ithaca, NY. IEEE 1998. pp. 920-924.

* cited by examiner

330

| 3, M - 4 331 | 3, M - 3 332 | 3, M - 2 333 | 3, M - 1 334 | 3, M 335 | 3, M + 1 336 | 3, M + 2 337 | 3, M + 3 338 | 3, M + 4 339 |

ROW 3

340

| 4, M - 4 341 | 4, M - 3 342 | 4, M - 2 343 | 4, M - 1 344 | 4, M 345 | 4, M + 1 346 | 4, M + 2 347 | 4, M + 3 348 | 4, M + 4 349 |

ROW 4

FIG.3

1-D Three Stage ME PIPELINE

2-D Three Stage ME PIPELINE

MULTI-DIMENSIONAL NEIGHBORING BLOCK PREDICTION FOR VIDEO ENCODING

This present application claims the benefit of U.S. Provisional Application No. 60/719,891, filed on Sep. 22, 2005, and assigned to the assignee hereof, which is hereby incorporated herein by reference in its entirety.

CROSS-REFERENCES TO RELATED APPLICATIONS

This patent application is related to the U.S. patent application entitled "Motion Estimation Techniques for Video Encoding," having Ser. No. 11/008,699, filed on Nov. 8, 2004, and assigned to the assignee hereof, which is hereby incorporated herein by reference in its entirety.

TECHNICAL FIELD

What is described herein relates to digital video processing and, more particularly, encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include the International Telecommunication Union (ITU) H.263 standard, QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. New standards continue to emerge and evolve, including the ITU H.264 standard and a number of proprietary standards.

Many video encoding standards allow for improved transmission rates of video sequences by encoding data in a compressed fashion. Compression can reduce the overall amount of data that needs to be transmitted for effective transmission of video frames. Most video encoding standards, for example, utilize graphics and video compression techniques designed to facilitate video and image transmission over a narrower bandwidth than can be achieved without the compression.

The MPEG standards and the ITU H.263 and ITU H.264 standards, for example, support video encoding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, some video encoding techniques may utilize similarities within frames, referred to as spatial or intra-frame correlation, to further compress the video frames.

In order to support compression, a digital video device includes an encoder for compressing digital video sequences, and a decoder for decompressing the digital video sequences. In many cases, the encoder and decoder form an integrated encoder/decoder (CODEC) that operates on blocks of pixels within frames that define the sequence of video images. In the International Telecommunication Union (ITU) H.264 standard, for example, the encoder typically divides a video frame to be transmitted into video blocks referred to as "macroblocks" (MB's) which may comprise 16 by 16 pixel arrays. The ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. Other standards may support differently sized video blocks.

For each video block in the video frame, an encoder searches similarly sized video blocks of one or more immediately preceding video frames (or subsequent frames) to identify the most similar video block, referred to as the "best prediction block." The process of comparing a current video block to video blocks of other frames is generally referred to as motion estimation. Once a "best prediction block" is identified for a video block, the encoder can encode the differences between the current video block and the best prediction block. This process of encoding the differences between the current video block and the best prediction block includes a process referred to as motion compensation. Motion compensation comprises a process of creating a difference block, indicative of the differences between the current video block to be encoded and the best prediction block. Motion compensation usually refers to the act of fetching the best prediction block using a motion vector, and then subtracting the best prediction block from an input block to generate a difference block.

After motion compensation has created the difference block, a series of additional encoding steps are typically performed to encode the difference block. These additional encoding steps may depend on the encoding standard being used. In MPEG4 compliant encoders, for example, the additional encoding steps may include an 8×8 discrete cosine transform, followed by scalar quantization, followed by a raster-to-zigzag reordering, followed by run-length encoding, followed by Huffman encoding. An encoded difference block can be transmitted along with a motion vector that indicates which video block from the previous frame (or subsequent frame) was used for the encoding. A decoder receives the motion vector and the encoded difference block, and decodes the received information to reconstruct the video sequences.

It is highly desirable to simplify and improve the encoding process. To this end, a wide variety of encoding techniques have been developed. Because motion estimation is one of the most computationally intensive processes in video encoding, improvements to motion estimation can provide notable improvements in the video encoding process.

It is desirable to find more efficient and accurate ways in computing motion vectors.

SUMMARY

This disclosure describes motion estimation techniques that can improve video encoding. In particular, this disclosure proposes a non-conventional ways to process video blocks in a frame. Techniques are described below for improving motion estimation. In one embodiment, a motion estimator is described that uses a two dimensional pipeline to generate accurate motion estimation parameters for a current video block. The two dimensional pipeline uses previously calculated motion estimation parameters of relevant neighboring video blocks, including a preceding video block on a same row as the current video block, prior to the generation of the accurate motion estimation parameters. The motion estimation parameters are, for example, motion vectors, motion vector predictors and mode decision.

The disclosed motion estimation techniques can improve the encoding by pipelining an engine/module to fetch pixels, an engine/module that performs an integer-pixel search, and an engine/module that performs a finer fractional and spatial search over at least two video block rows in a ping pong fashion. During the ping portion, two video blocks from a first block row are processed, while simultaneous processing on another video block row is taking place. During the pong portion, two video blocks from a second block row are processed, while on a first block row another video block is being processed. Processing in this ping-pong fashion allows the integer search engine/module to compute and output more accurate motion vector related cost due to the exact motion vector predictor (MVP) which can only be obtained after fractional and spatial engine/module has finished processing all the neighboring video blocks. The MVP is an early estimate of a desired motion vector and is typically computed based on motion vectors previously calculated for neighboring video blocks. In techniques where only one video block row is processed sequentially the MVP's may be an estimate not an actual value. Using only the estimate limits the accuracy that can be used in motion estimation. One of the advantages of using the disclosed technique is to use all the finer resolution actual values in calculating motion estimation. Another advantage, is that the use of a two dimensional pipeline resolves the problem of needing to wait for one entire row to be processed before processing parts of another row. As such, processing in this ping-pong fashion with a two dimensional pipeline reduces the bandwidth on a communication bus. The number of refreshes to an external memory to update a search area may also significantly be reduced.

The embodiments in this disclosure propose the computation of distortion measures. The embodiments describes a method comprising computing a motion vector predictor based on motion vectors previously calculated for video blocks in proximity to a current video block to be encoded, and using the motion vector predictor in searching for a prediction video block used to encode the current video block. The embodiments further describe a method which uses all actual motion vector predictors to minimize the computation of distortion measures.

These and other techniques described herein may be implemented in a digital video device in hardware, software, firmware, or any combination thereof. If implemented in software, the techniques may be directed to a computer readable medium comprising program code, that when executed, performs one or more of the encoding techniques described herein. Additional details of various embodiments are set forth in the accompanying drawings and the description below. Other features, objects and advantages will become apparent from the description and drawings, and from the claims.

BRIEF DESCRIPTION OF DRAWINGS

FIG. 3 is an exemplary illustration of two partial rows of an image.

DETAILED DESCRIPTION

This disclosure describes multi-dimensional techniques to calculate both motion vectors (MV's) and motion vector predictors (MVP) which aid in motion estimation techniques that can be used to improve video encoding. Although the techniques are generally described in the context of an overall process for motion estimation, it is understood that one or more of the techniques may be used individually in various scenarios. The MVP is typically computed based on motion vectors previously calculated for neighboring video blocks, e.g., as a median of motion vectors of adjacent video blocks that have been recorded. However, other mathematical functions could alternatively be used to compute the MVP, such as the average of motion vectors or neighboring video blocks or possibly a more complex mathematical function.

Figure 1A:
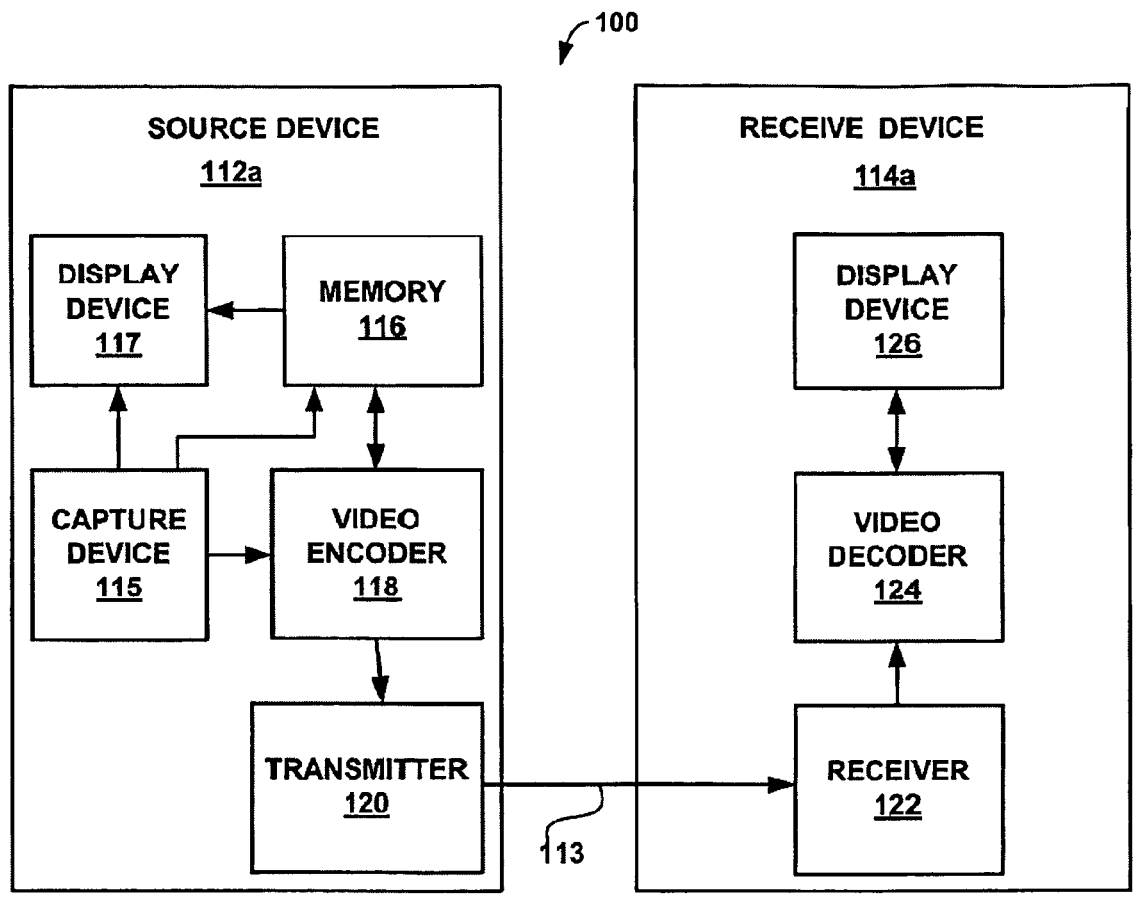
FIG. 1A is a block diagram illustrating an example system in which a source digital video device transmits an encoded bitstream to receive a digital video device.

FIG. 1A is a block diagram illustrating an example system 100 in which a source device 112a transmits an encoded bitstream via communication link 113 to receive device 114a. Source device 112a and receive device 114a may both be digital video devices. In particular, source device 112a encodes video data consistent with a video standard such as the MPEG-4 standard, the ITU H.263 standard, the ITU H.264 standard, or any of a wide variety of other standards that make use of motion estimation in the video encoding. One or both of devices 112a, 114a of system 100 implement motion estimation and compensation techniques, as described in greater detail below, in order to improve the video encoding process.

Communication link 113 may comprise a wireless link, a physical transmission line, fiber optics, a packet based network such as a local area network, wide-area network, or global network such as the Internet, a public switched telephone network (PSTN), or any other communication link capable of transferring data. The communication link 113 may be coupled to a storage media such as CD, DVD etc. Thus, communication link 113 represents any suitable communication medium, or possibly a collection of different networks and links, for transmitting video data from source device 112a to receive device 114a.

Source device 112a may include a video capture device 115, such as a video camera, to capture video sequences and store the captured sequences in memory 116. The video sequences may be viewed on display 117. In particular, video capture device 115 may include a charge coupled device (CCD), a charge injection device, an array of photodiodes, a complementary metal oxide semiconductor (CMOS) device, or any other photosensitive device capable of capturing video images or digital video sequences.

As further examples, video capture device 115 may be a video converter that converts analog video data to digital video data, e.g., from a television, video cassette recorder, camcorder, or another video device. In some embodiments, source device 112a may be configured to transmit real-time video sequences over communication link 115. In that case, receive device 114a may receive the real-time video sequences and display the video sequences to a user. Alternatively, source device 112a may capture and encode video sequences that are sent to receive device 114a as video data files, i.e., not in real-time. Thus, source device 112a and receive device 114a may support applications such as video clip playback, video mail, or video conferencing, e.g., in a mobile wireless network. Devices 112a and 114a may include various other elements that are not specifically illustrated in FIG. 1A.

Furthermore, source device 112a may be any digital video device capable of encoding and transmitting video data. Source device 112a may also a video encoder 118 to encode the sequences, and a transmitter 120 to transmit the encoded bitstream over communication link 115 to source device 114a. Video encoder 118 may include, for example, various hardware, software or firmware, or one or more digital signal processors (DSP) that execute programmable software modules to control the video encoding techniques, as described herein. Associated memory and logic circuitry may be provided to support the DSP in controlling the video encoding techniques. As will be described, video encoder 118 may perform better if accurate values of motion vector predictor (MVPs) are used.

Receive device 114a may take the form of any digital video device capable of receiving and decoding video data. For example, receive device 114a may include a receiver 122 to receive encoded digital video sequences from transmitter 120, e.g., via intermediate links, routers, other network equipment, and like. Receive device 114a also may include a video decoder 124 for decoding the bitstream, and a display device 126 to display the sequences of the decoded bitstream to a user. In some embodiments, however, receive device 114a may not include an integrated display device 114a. In such cases, receive device 114a may serve as a receiver that decodes the received video data to drive a discrete display device, e.g., a television or monitor.

Example devices for source device 112a and receive device 114a include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as mobile telephones having video capabilities, direct two-way communication devices with video capabilities other wireless video devices, and the like.

Figure 1B:
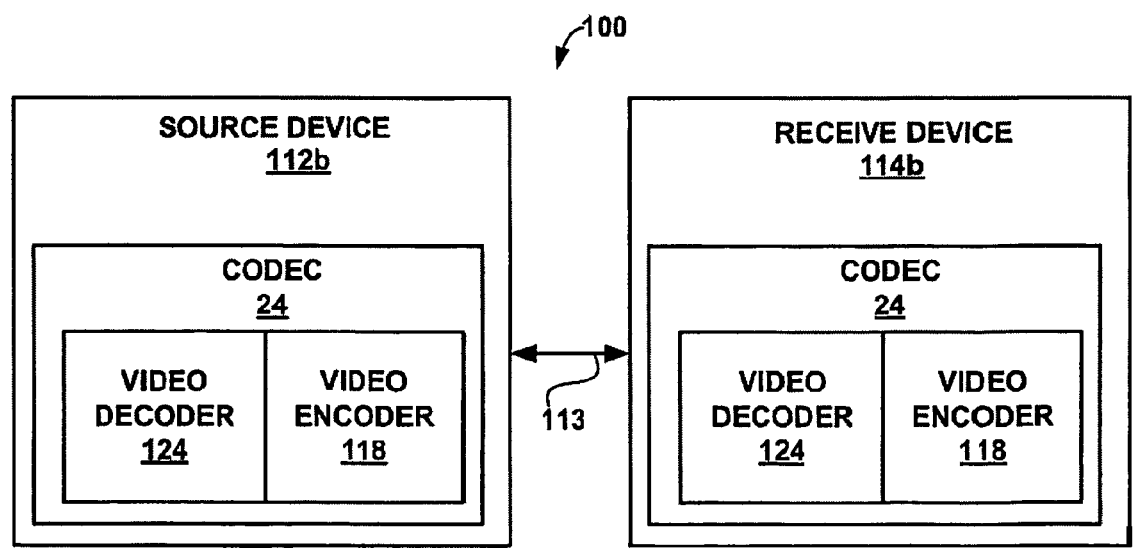
FIG. 1B is a block diagram of two CODEC's that may be used as described in an embodiment herein.

In some cases, a source device 112b and receive device 114b may each include an encoder/decoder (CODEC) as shown in FIG. 1B, for encoding and decoding digital video data. In particular, both source device 112a and receive device 114a may include transmitters and receivers as well as memory and displays. Many of the encoding techniques outlined below are described in the context of a digital video device that includes an encoder. It is understood, however, that the encoder may form part of a CODEC. In that case, the CODEC may be implemented within hardware, software, firmware, a DSP, a microprocessor, an application specific integrated circuit (ASIC), a field programmable gate array (FPGA), discrete hardware components, or various combinations thereof.

Video encoder 118 within source device 112a or source device 112b operates on blocks of pixels within a sequence of video frames in order to encode the video data. For example, video encoder 118 may execute motion estimation and motion compensation techniques in which a video frame to be transmitted is divided into blocks of pixels (referred to as video blocks). The video blocks, for purposes of illustration, may comprise any size of blocks, and may vary within a given video sequence. As an example, the ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. The use of smaller video blocks in the video encoding can produce better compression in the encoding, and may be specifically used for locations of video frame that include higher levels of detail.

Each pixel in a video block may be represented by an n-bit value, e.g., 8 bits, which defines visual characteristics of the pixel such as the color and intensity in values of chrominance and luminance. However, motion estimation is often performed only on the luminance component because human vision is more sensitive to changes in luminance than chromaticity. Accordingly, for purposes of motion estimation, the entire n-bit value may quantify luminance for a given pixel. The principles of this disclosure, however, are not limited to the format of the pixels, and may be extended for use with simpler fewer-bit pixel formats or more complex larger-bit pixel formats.

For each video block in the video frame, video encoder 118 of source device 112a or 112b performs motion estimation by searching video blocks stored in memory 116 for one or more preceding video frames already transmitted (or a subsequent video frames) to identify a similar video block, referred to as a prediction video block. In some cases, the prediction video block may comprise the "best prediction block" from the preceding or subsequent video frame, although this disclosure is not limited in that respect. Video encoder 118 performs motion compensation to create a difference block indicative of the differences between the current video block to be encoded and the best prediction block. Motion compensation usually refers to the act of fetching the best prediction block using a motion vector, and then subtracting the best prediction block from an input block to generate a difference block.

After the motion compensation process has created the difference block, a series of additional encoding steps are typically performed to encode the difference block. These additional encoding steps may depend on the encoding standard being used.

Once encoded, the encoded difference block can be transmitted along with a motion vector or encoded motion vector that identifies the video block from the previous frame (or subsequent frame) that was used for encoding. In this manner, instead of encoding each frame as an independent picture, video encoder 118 encodes the difference between adjacent frames. Such techniques can significantly reduce the amount of data that needed to accurately represent each frame of a video sequence.

The motion vector may define a pixel location relative to the upper-left-hand corner of the video block being encoded, although other formats for motion vectors could be used. By encoding video blocks using motion vectors, the required bandwidth for transmission of streams of video data can be significantly reduced.

In some cases, video encoder 118 can support intra-frame encoding, in addition to inter-frame encoding. Intra-frame encoding utilizes similarities within frames, referred to as spatial or intra-frame correlation, to further compress the video frames. Intra-frame compression is typically based upon texture encoding for compressing still images, such as discrete cosine transform (DCT) encoding. Intra-frame compression is often used in conjunction with inter-frame compression, but may also be used as an alterative in some implementations.

Receiver 122 of receive device 114a may receive the encoded video data in the form of motion vectors and encoded difference blocks indicative of encoded differences between the video block being encoded and the best prediction block used in motion estimation. In some cases, however, rather than sending motion vectors the difference between the motion vectors and the MVP are transmitted. In any case, decoder 124 can perform video decoding in order to generate video sequences for display to a user via display device 126. The decoder 124 of receive device 114a may also be implemented as an encoder/decoder (CODEC) as shown in FIG. 1B. In that case, both source device 112b and receive device 114b may be capable of encoding, transmitting, receiving and decoding digital video sequences.

Figure 2:
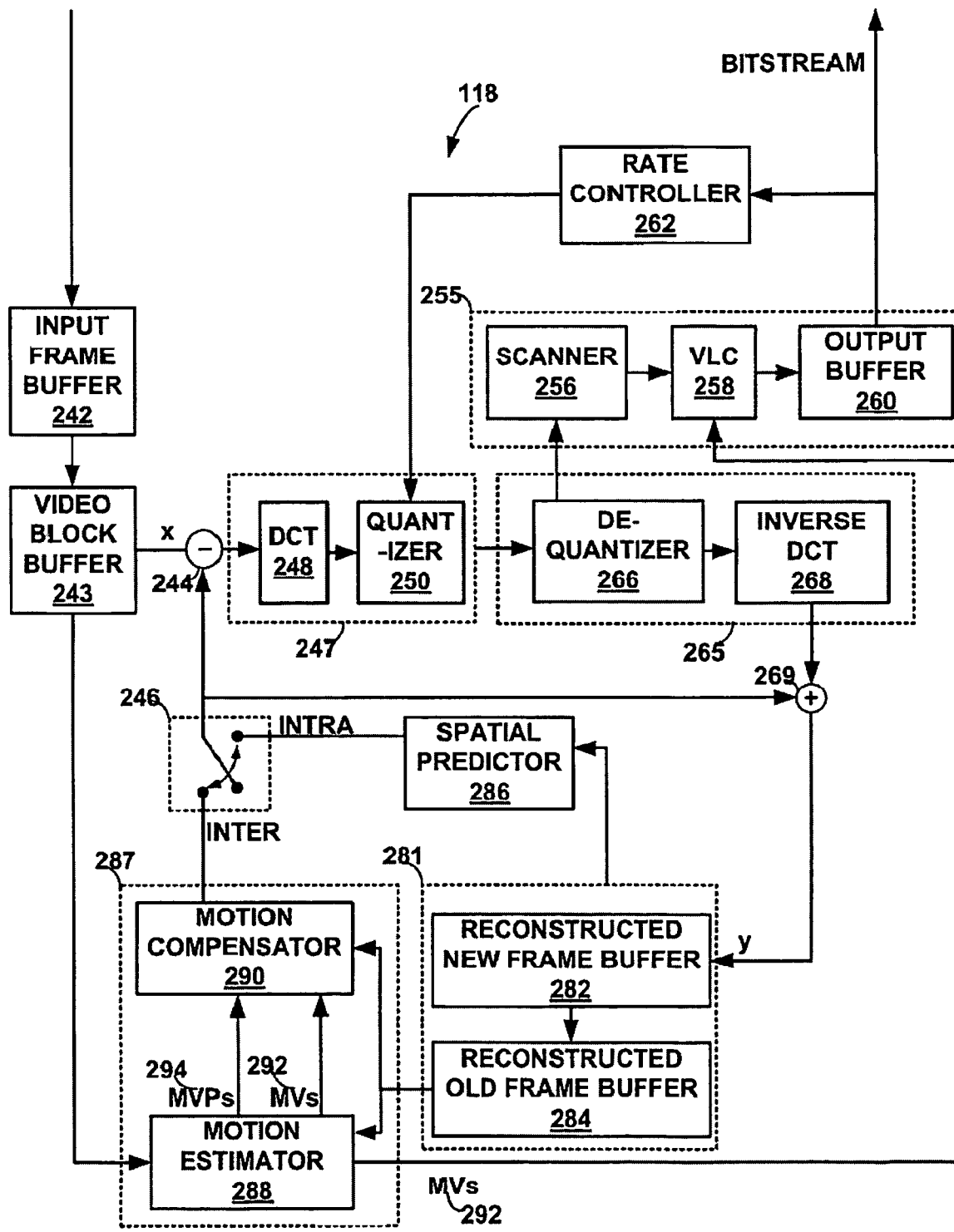
FIG. 2 is an exemplary block diagram of a basic digital video encoder that may be used in the digital video device illustrated in FIG. 1A or FIG. 1B.

FIG. 2 illustrates an exemplary video encoder that may be used in a device of FIG. 1A or FIG. 1B. Frames or part of frames from a video sequence may be placed in an input frame buffer 242 inside a video encoder 118 that may be part of CODEC 24. An input frame from input frame buffer 242 may be parsed into blocks (the video blocks may be of any size, but standard square video block sizes are 4×4, 8×8, or 16×16) and sent to video block buffer 243. Video block buffer 243 typically sends a video block to subtractor 244. Subtractor 244 subtracts video block x from the output of switch 246. Switch 246 may switch between intra-coding and inter-coding prediction modes of encoding. If switch 246 is enabling an inter-coding prediction mode, then the resulting difference from x and a video block from a different (previous or subsequent) frame is compressed through texture encoder 247. If switch 246 enables an intra-coding prediction mode, then the resulting difference from x and predicted value from a previous video block in the same frame is compressed through texture encoder 247.

Texture encoder 247 has a DCT block 248 which transforms the input x (the video block or difference block) from the pixel domain to a spatial frequency domain. In the spatial frequency domain, data is represented by DCT block coefficients. The DCT block coefficients represent the number and degree of the spatial frequencies detected in the video block. After a DCT is computed, the DCT block coefficients may be quantized by quantizer 250, in a process is known as "block quantization." Quantization of the DCT block coefficients (coming from either the video block or difference video block) removes part of the spatial redundancy from the block. During this "block quantization" process, further spatial redundancy may sometimes be removed by comparing the quantized DCT block coefficients to a threshold. This comparison may take place inside quantizer 250 or another comparator block (not shown). If the magnitude of a quantized DCT block coefficient is less than the threshold, the coefficient is discarded or set to a zero value.

After block quantization, the resulting output may be sent to two separate structures: (1) a texture decoder 265, and (2) an entropy encoder 255. Texture decoder 265 comprises a de-quantizer 266 which aids in the production of a reconstructed video block or frame; to be used with a coding prediction mode. The entropy encoder 255 produces a bit-stream for transmission or storage. Entropy encoder 255 may contain a scanner 256 which receives the block quantized output and re-order it for more efficient encoding by variable length coder (VLC) 258. VLC 258 may employ the use of run-length and huffman coding techniques to produce an encoded bit-stream. The encoded bitstream is sent to output buffer 260. The bitstream may be sent to rate controller 262.

While maintaining a base quality, rate controller 262 budgets the number of quantization bits used by quantizer 250. Entropy encoding is considered a non-lossy form of compression. Non-lossy compression signifies that the data being encoded may be identically recovered if it is decoded by an entropy decoder without the encoded data having been corrupted. Entropy encoder 255 performs non-lossy compression.

Lossy compression means that as a result of the encoding, an input, x, will not produce an identical copy of x even though the encoded input has not been corrupted. The reconstructed input has "lost" part of its information. Texture encoder 247 performs lossy compression. A typical video encoder 118 usually has a local texture decoder 265 to aid in the compensation of both the inter-coding and intra-coding prediction modes. De-quantizer 266, inverse DCT 268, and the output of switch 246 that is sent to adder 269 work together to decode the output of texture encoder 247 and reconstruct the input x that went into texture encoder 247. The reconstructed input, y, looks similar to x but is not exactly x. A general video "decoder" typically comprises the functionality of the de-quantizer 266, inverse DCT 68, and the output of switch 246 that is sent to adder 269.

The reconstructed input may be sent to memory buffer 281. Inside memory buffer 281 there may be two memory buffers: (1) reconstructed new frame buffer 282; and (2) reconstructed old frame buffer 284. Reconstructed new frame buffer 282, stores the currently processed reconstructed frame (or partial frame). Reconstructed old frame buffer 284 stores a past processed reconstructed frame. The past processed reconstructed frame is used as a (reconstructed) reference frame. The reconstructed reference frame may be a frame that is before or after the current frame in input frame buffer 242. The current frame (or a video block from the current frame) or differences between the current frame and the reconstructed reference frame (or a video block from the difference block) is what is "currently" being encoded. After the current frame has finished encoding and before the next frame in input from input frame buffer 242 is fetched to be encoded, the reconstructed old frame buffer 284 is updated with a copy with the contents of the reconstructed new frame buffer 282.

Reconstructed new frame buffer 282 may send the reconstructed video block it received to be used in spatial predictor 286. Reconstructed old frame buffer 284 sends a past processed reconstructed video block to MEC (motion estimation and compensation block) 287. MEC block comprises motion estimator 88 and motion compensator 290. Motion estimator 288 generates motion vectors (MV) 92 and motion vector predictors (MVP) 294 that may be used by motion compensator 290 to compensate for differences from other frames than the one being encoded. MVs 292 may also be used by entropy encoder 255. In some standards, such as ITU H.264, the output of spatial predictor 286 is used in intra-frame prediction mode and fed back both to subtractor 244 and adder 269. In some standards, such as MPEG-4 or JPEG, there is no spatial predictor 286.

FIG. 3 illustrates two partial block rows of any image or frame. As an example, let block row N−1 and N be block row 3 and block row 4. In block row 3 330 there are nine video blocks. For illustrative purposes 16×16 blocks may be used throughout the description of the disclosure. Hence, macroblocks (MB's), 331-339 are in row 3 330, and in row 4 340 there are nine MB's 341-749. The MB's are drawn showing both the block row number and the location relative to the Mth macroblock. M denotes a current macroblock. Typically block row 3 is processed before block row 4. Within this disclosure processing a block row means processing a row of macroblocks as outlined in row 3 330 and row 4 340. In general, it can also mean the processing of any size of video block row.

When calculating motion vectors relative to macroblock (MB) 345 in various standards, such as H.264, MPEG-4, and H.263, etc., it may be desired to have prior knowledge of MB modes and motion vectors of the neighboring MB 344, MB 335, and MB 336 (or MB 334 when MB 336 is not available). For example, in H.264, the INTER modes for a P-frame can be INTER 16×16, INTER 16×8, INTER 8×16, INTER 8×8. If it is an INTER 8×8 mode then a further partition can be made to select INTER 8×4, INTER 4×8 or INTER 4×4 modes. The mode is not only dependent on they type (INTER) but also the size. There can also be INTRA mode and SKIP mode. Although there are other conditions that invoke SKIP mode, one condition that may invoke SKIP mode is when the MV equals the MVP.

Motion estimation, for example, typically requires a larger amount of computational resources than any other process of video encoding. For this reason, it is highly desirable to perform motion estimation in a manner that can reduce computational complexity and also help in improving the compression ratio. The motion estimation techniques described herein may advance these goals by using a search scheme that performs the searching at multiple spatial resolutions, thereby reducing the computational complexity without any loss in accuracy. In addition, a cost function, also known as a distortion measure is proposed, that includes the cost of encoding motion vectors. A motion estimator may also use multiple candidate locations of a search space to improve the accuracy of video encoding, and the search area around the multiple candidates may be programmable, thus making the process scalable with fame rate and picture sizes. Finally, a motion estimator may also combine cost functions for many small square video blocks, e.g., 4 by 4 video blocks, to obtain the cost for the various larger block shapes, e.g., 4 by 8 video blocks, 8 by 4 video blocks, 8 by 8 video blocks, 8 by 16 video blocks, 16 by 8 video blocks, 16 by 16 video blocks, and so forth.

For many operations and computations, a motion vector predictor (MVP) is used to add a cost-factor for motion vectors deviating from the motion vector predictor. The MVP may also provide an additional initial motion vector, which can be used to define searches, particularly at high resolution stages of a multi-stage search. The calculation of distortion measure values that depend at least in part the motion vector prediction values is part of the cost-factor. Distortion measure values may also help quantify the number of bits needed to encode different motion vectors.

Figure 4:
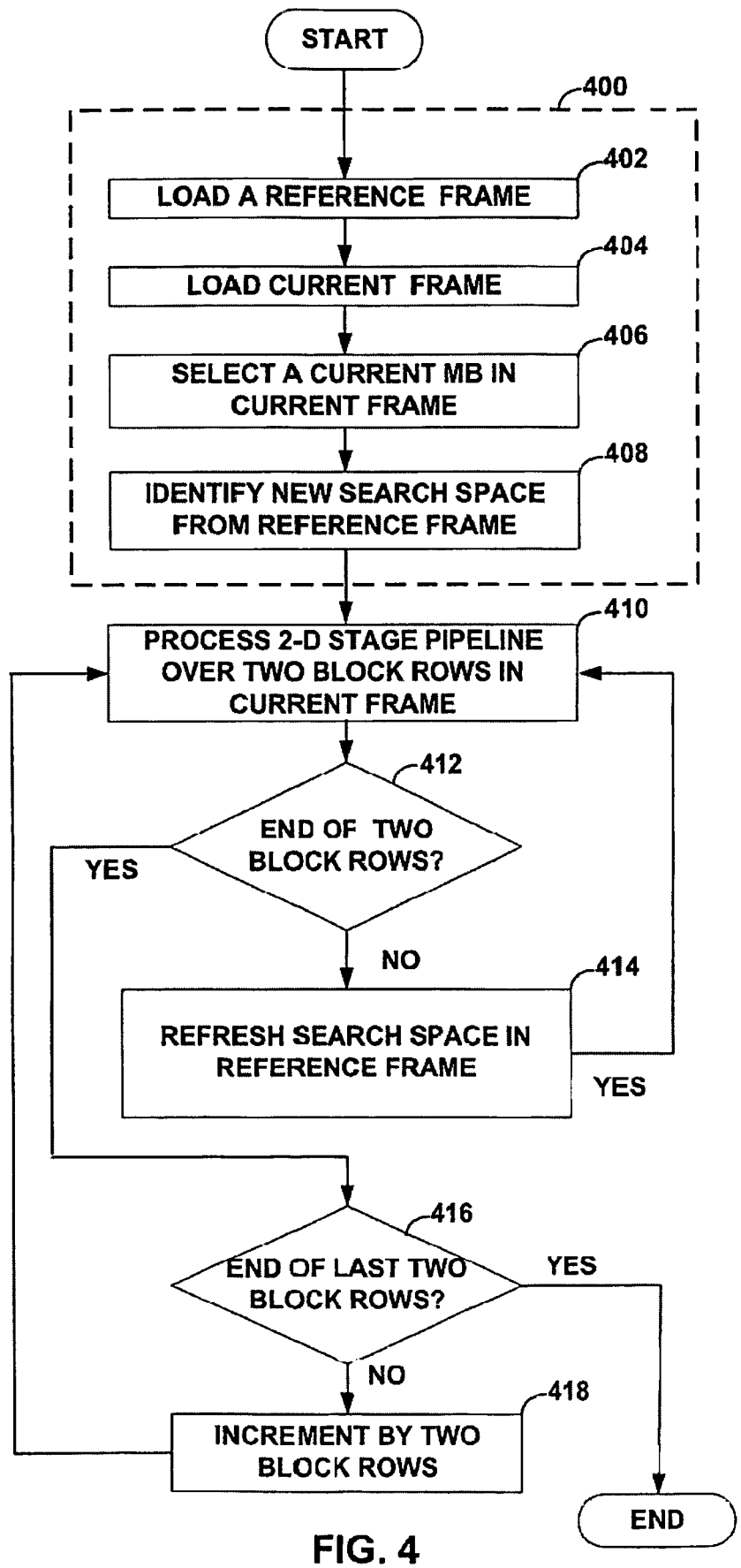
FIG. 4 is an exemplary flow chart illustrating the process by which motion estimation and motion vector prediction may be done over two video block rows.

FIG. 4 is an exemplary flow chart describing the process of how motion estimation can be done throughout a frame. First a setup procedure 400 is initiated. As part of the setup a reference (a past or future) frame is loaded 402 into a memory. For example, the memory may be a local memory or off-memory candidate RAM. Then a current frame is loaded 404 into a memory. For example, the memory may also be part of the local memory or off-memory encode RAM. This is followed by a selection of the current macroblock M in a block row. Then a search space is identified 406 around the current macroblock M. Once a search space has been identified from a reference frame 408, the act of processing a 2-D stage pipeline over two video block rows in a current frame 410 takes place. This is an improvement over the current art which only considers processing of one video block row at a time via a 1-D stage pipeline. After each 2-D stage pipeline act is performed, decision block 412 checks if the end of two block rows has been reached. If the end of the two block rows has not been reached (NO), then the search space in the reference frame is refreshed 414, and processing of the 2-D stage pipeline over two block rows in a current frame 410 continues. If the end of two block rows has been reached (YES) then another check is performed by decision block 416. Decision block 416 checks if it is the end of the last two block rows in the current frame. If it is not the end of the last two block rows in a current frame (NO), then the act of incrementing to the next two block rows 418 is performed, and processing of the 2-D stage pipeline over two block rows in a current frame 410 continues. If it is the end of the last two block rows in a current frame (YES) processing of the current frame ends.

Motion estimation (ME) involves processing a video block by at least two engines. The first engine is a fetch engine (FE), and may fetch video blocks from a memory to be encoded. The second engine uses a distortion metric to find a similar matching block which minimizes the distortion. The second engine is an integer search engine (ISE), and may employ a hierarchical search with search being performed in a finer resolution as it proceeds. There may also be a third engine, a fractional and spatial search engine (FSE), which may use a finer resolution search to find a similar matching block which minimizes the distortion. The FSE may or may not use the results of the second engine as a starting point. For exemplary purposes, description of the motion estimation technique is done with three engines, the fetch Engine (FE), the integer Search Engine (ISE), and the fractional and spatial search engine (FSE). These three engines process a video block in a sequential fashion. Typically, to minimize the delay of the processing, the three engines are pipelined over three stages. That is to say, an FE, ISE, and FSE all operate in parallel in a three stage pipeline. For example, during stage 1, an FE fetches from a memory the current macroblock M, while simultaneously, an ISE positioned with an integer pixel anchor point at the corner of a macroblock M−1 tries to find the best match macroblock from a reference (a past or future) frame. Still during stage 1, simultaneously operating at the same time as the FE and ISE engines, an FSE positioned at a fractional pixel anchor point in macroblock M−2 tries to find the best match macroblock from a reference (a past or future) frame. It takes three stages to complete the complete processing of one video block to generate a motion vector. At the end of three stages there will have been three fetches, three integer searches performed and three fractional and spatial searches performed. Typically, the one dimensional (1D) three stage pipeline operates sequentially over one video block row. No processing takes place in the second block row until the whole video block row has been completely processed.

Figure 5:
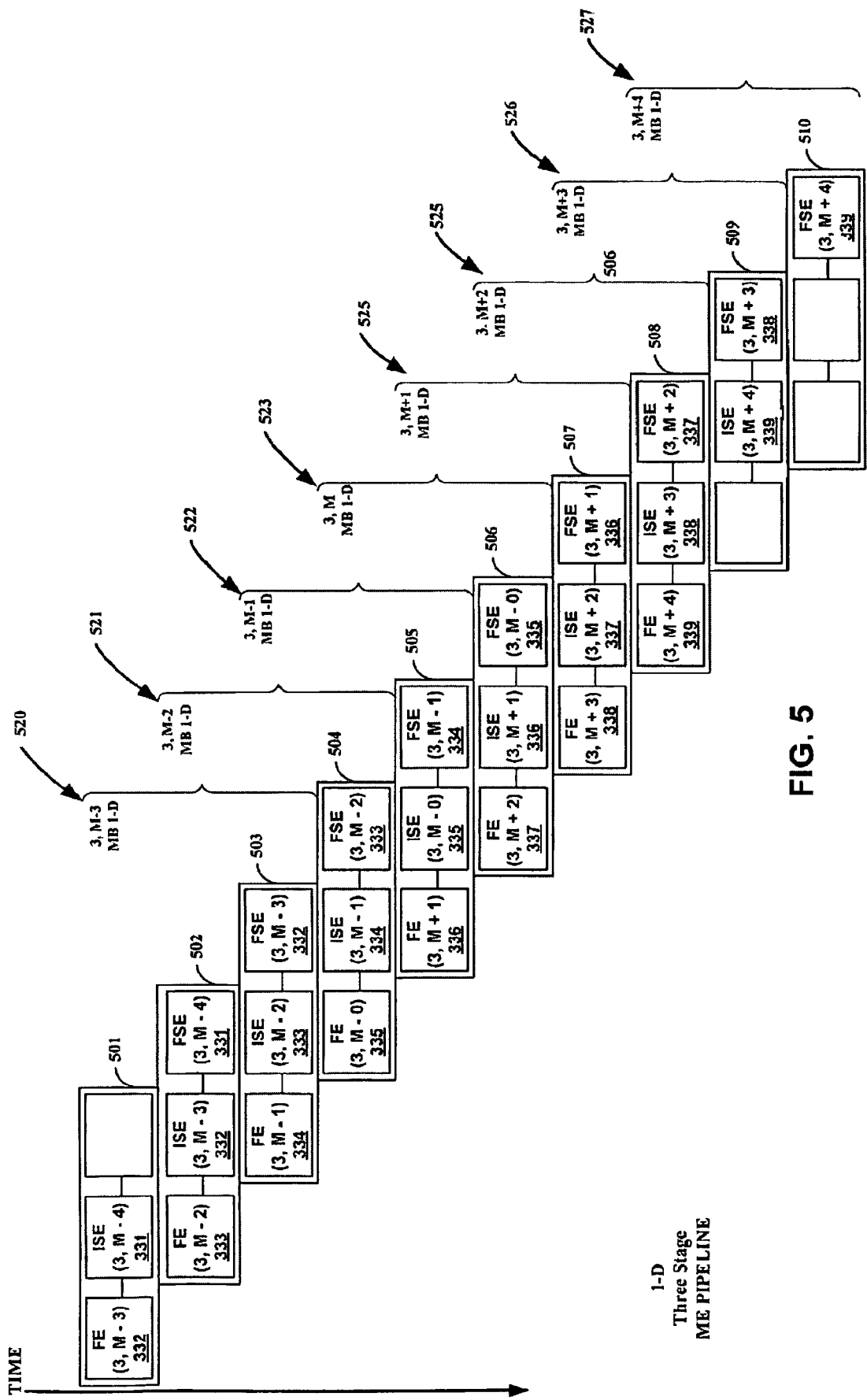
FIG. 5 is an exemplary illustration of an ME pipeline applied over a partial image row.

FIG. 5 illustrates a conceptual illustration of the 1 D three stage pipeline. As can be seen most of row 3 330 is being processed. In the upper left corner of FIG. 5, two of the three engines are running during stage 1 501 of the 3, M−3 MB pipeline 520. FE operates on macroblock 3, M−3 332, and ISE operates on macroblock 3, M−4 331. Stage 2 502 of the 3, M−3 MB pipeline 520 and stage 3 503 of the 3, M−3 MB pipeline 520 complete the generation of motion vectors after the FSE is completed on the 3, M−3 MB (macroblock) 332. As mentioned previously, in general, at each stage a fetch, an integer search, and a fractional and spatial search is performed. With the exception of the initial fetch of the 3, M−4 macroblock 331, all macroblocks (MBs) in row 3 330 of FIG. 3 are processed in FIG. 5. For 1D pipelines 521-527, stage1 of the next pipeline is always stage 2 of the previous pipeline. Stage 2 of the next pipeline is stage 3 of the previous pipeline. Thus, stages 502-510 may be a stage 1, stage 2 or stage 3 stage in a pipeline, depending on which pipeline is currently operating. In general it takes N+2 stages to process N macroblocks (i.e. video blocks) using a 1D pipeline.

For a given macroblock, the 1D pipeline technique constrains the current ISE to not use the FSE result of the previous motion block to its advantage. For example, when the FE is fetching the encode data and updating the memory for MB 335, ISE is working on integer search for MB 334 and FSE is performing fractional search and spatial estimation for MB 333. An inherent problem with the 1D pipeline is that ISE does not know the modes and final motion vectors (MV's) of its left neighboring MB and thus is not able to obtain an accurate estimate of the motion vector predictors (MVP's). As a result the motion vector computation may be slightly off. Hence, by using a 1 D pipeline technique, there exists a mutual dependency between motion estimation (generating MV's) and mode decision (generating MVP's).

Figure 6:
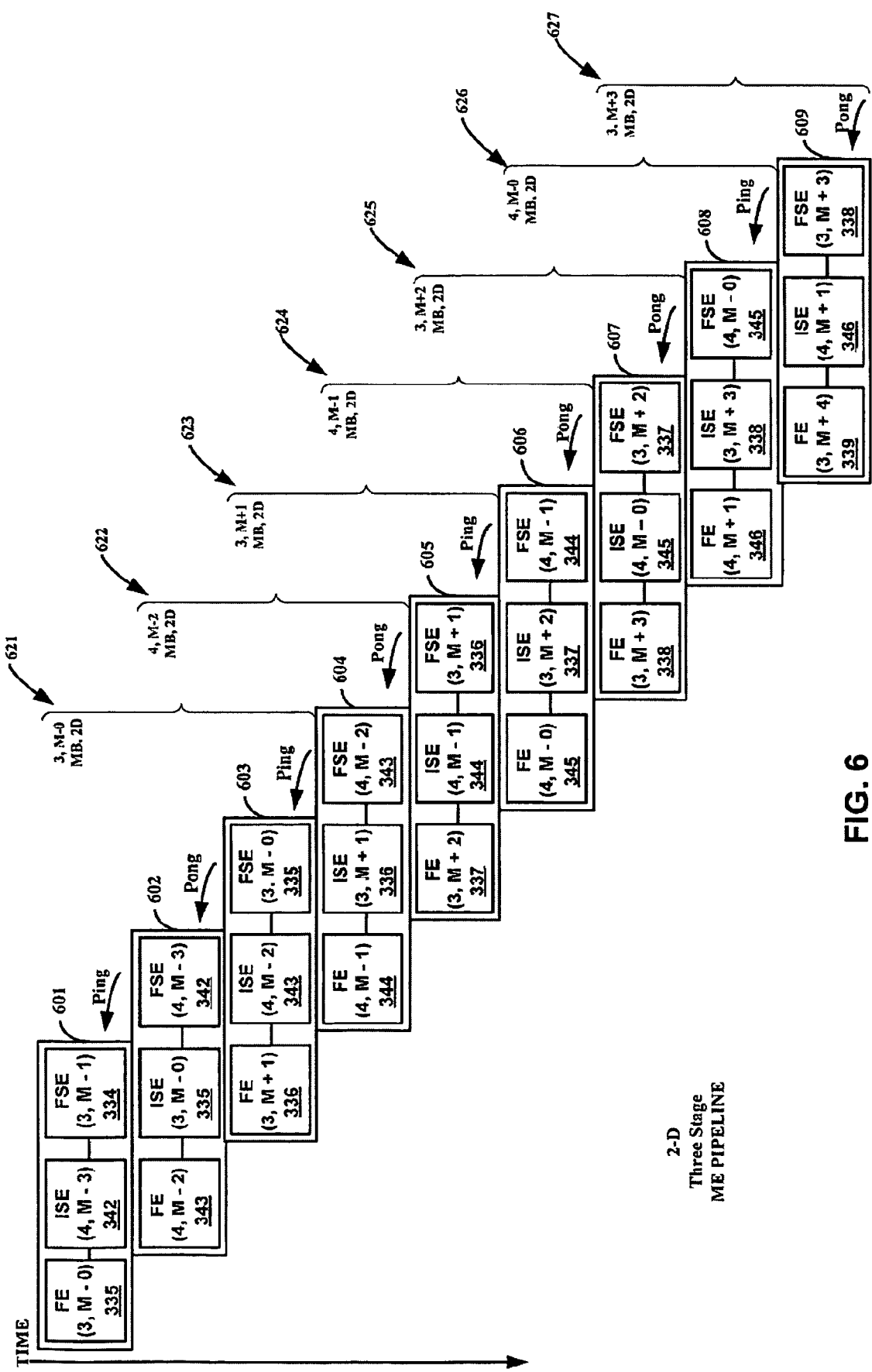
FIG. 6 is an exemplary illustration of an ME pipeline applied over two partial image rows.

A motion estimation technique that resolves the mutual dependencies between motion estimation and mode decision is illustrated in FIG. 6. FIG. 6 is an exemplary diagram illustrating a three stage two-dimensional (2D) pipeline, motion estimation technique that allows the ISE prior knowledge of all the relevant neighboring MB modes and MV's. In FIG. 6, the two video block rows are processed in a ping pong fashion. During the ping portion, two video blocks from a first video block row are processed, while simultaneous processing on another video block row is taking place. During the pong portion, two video blocks from a second video block row are processed, while on a first video block row another video block is being processed.

In the upper left corner of FIG. 6, illustrates stage 1 601 of the 3, M-0 MB 2D pipeline 621. FE operates on macroblock 3, M-0 335, and ISE operates on macroblock 4, M-3 342, while FSE operates on macroblock 3, M-1 334. During stage 2 602 of the 3, M-0 MB 2D pipeline 621, FE operatres on macroblock 4,M-2 343, and ISE operates on macroblock 3, M-0 335, while FSE operates on macroblock 4, M-3 342. During stage 3 603 of the 3, M-0 MB 2D pipeline 621, FE operatres on macroblock 3,M+1 336, and ISE operates on macroblock 4, M-2 343, while FSE operates on macroblock 3, M-0 335. After completion of the 3, M-0 MB 2D pipeline 621 generation of motion vectors after the FSE is completed on the 3, M-0 MB 335. Stages 602-609 may be used as described above to complete 2D pipelines 622-627. Every "ping/pong", see FIG. 6, represents an FE/FSE operation on one row while there is an ISE on another row. The ping pong terminology is associated with the switching of roles between rows. For example, during the "ping" FE/FSE operate on row 3, and ISE operates on row 4. During the "pong" FE/FSE operate on row 4, and ISE operates on row 3.

An advantage of using the 2D pipeline is that two macroblocks from at least two different rows but close in proximity (in this example, horizontal position) may share a majority of the search area. Since the pong can re-use search area from the ping there will be less fetches required. Processing in this ping-pong fashion reduces the bandwidth on a communication bus. The number of refreshes to an external memory to update a search area may also significantly be reduced. The number of refreshes to an external memory to update a search area may also significantly be reduced.

In addition, macroblock 345 can use the mode decision from relevant neighboring macroblocks, 344, 335, and 334 (or 336 if 334 is not available). The use of mode decision means that the motion vector predictor from each of those relevant neighboring macroblocks may aid in producing an accurate estimate of the motion vector. Without the 2D ping pong pipeline, an accurate motion vector predictor from neighboring macroblock 344 may not be available in the computation of macroblock's 345 motion vector generation. Hence, the two-dimensional pipeline resolves a mutual dependency between a motion estimation video block and a mode decision.

A number of different embodiments have been described. The techniques may be capable of improving video encoding by improving motion estimation. The techniques may be implemented in hardware, software, firmware, or any combination thereof. If implemented in software, the techniques may be directed to a computer readable medium comprising program code, that when executed in a device that encodes video sequences, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components such as a motion estimator to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

What is claims is:

1. A method of video encoding comprising:
receiving, at a pipeline of a motion estimator, a first block from a first block row of a plurality of block rows of a frame;
generating, by the pipeline, a first output of the motion estimator, the first output including a first motion vector of the first block;
receiving, at the pipeline, a second block from a second block row of the plurality of block rows of the frame;
generating, by the pipeline, a second output of the motion estimator, the second output including a second motion vector of the second block, wherein the second motion vector is generated subsequent to the first motion vector; and
receiving, at the pipeline, a third block from the first block row to generate a third motion vector, wherein the third motion vector is generated based on the first motion vector, and wherein the third motion vector is generated subsequent to the second motion vector.

2. The method of claim 1, further comprising processing the third block using the pipeline, wherein processing the third block comprises:
generating a motion vector predictor of the third block based on the first motion vector,
using the motion vector predictor in searching for a prediction block to encode the third block; and
generating a difference block indicative of differences between the third block to be encoded and the prediction block.

3. The method of claim 2, further comprising identifying a prediction block motion vector of the prediction block by calculating distortion measure values that depend at least in part on the motion vector predictor.

4. The method of claim 3, wherein the distortion measure values quantify a number of bits needed to encode different motion vectors.

5. The device of claim 1, wherein the pipeline comprises a first stage, a second stage, and a third stage, wherein, when the first stage of the pipeline operates on the third block, the second stage operates on the second block and the third stage operates on the first block.

6. The method of claim 1, wherein the pipeline includes at least two stages.

7. The method of claim 1, wherein the third block is a 16×16 video block, a 16×8 block, an 8×16 block, an 8×8 block, an 8×4 block, a 4×8 block, a 4×4 block, or a 2×2 block.

8. The method of claim 1, wherein the first block, the second block, and the third block are each received at a first stage of the pipeline, wherein the first block is received during a first execution cycle of the pipeline, the second block is received during a second execution cycle of the pipeline, and the third block is received during a third execution cycle of the pipeline.

9. The method of claim 8, wherein the first block is processed at a second stage of the pipeline during the second execution cycle and processed at a third stage of the pipeline during the third execution cycle.

10. The method of claim 9, wherein a fetch engine operates on the first block during the first execution cycle, wherein an integer search engine operates on the first block during the second execution cycle, and wherein a fractional spatial search engine operates on the first block during the third execution cycle.

11. The method of claim 9, wherein the first motion vector is generated based on the third stage of the pipeline operating on the first block during the third execution cycle, wherein the second stage of the pipeline operates on the third block during a fourth execution cycle, and where a motion vector predictor of the third block is generated based on the second stage of the pipeline operating on the third block during the fourth execution cycle, the motion vector predictor of the third block generated based on the first motion vector.

12. An encoding device comprising:
a motion estimator including a pipeline configured to process multiple blocks to be encoded, wherein, for each block of the multiple blocks, the pipeline is configured to compute a corresponding motion vector predictor and a corresponding motion vector, wherein the pipeline is configured to:
receive a first block from a first block row of a plurality of block rows of a frame and output a first motion vector of the first block;
receive a second block from a second block row of the plurality of block rows of the frame and output a second motion vector of the second block, wherein the second motion vector is generated subsequent to the first motion vector; and
receive a third block from the first block row and output a third motion vector of the third block, wherein the third motion vector is generated based on the first motion vector, and wherein the third motion vector is generated subsequent to the second motion vector.

13. The encoding device of claim 12, further comprising a motion compensator configured to receive the third motion vector from the motion estimator, wherein the motion compensator generates a difference block indicative of differences between the third block to be encoded and a prediction block associated with the third motion vector.

14. The encoding device of claim 12, wherein the motion compensator identifies the third motion vector associated with a prediction block and calculates distortion measure values that depend at least in part on a motion vector predictor of the third block, wherein the distortion measure values quantify a number of bits needed to encode different motion vectors.

15. The encoding device of claim 14, wherein the motion estimator performs searches in stages at different spatial resolutions to identify a prediction block to encode the third block, and wherein the third motion vector is generated based on the prediction block.

16. The encoding device of claim 12, wherein the pipeline includes at least three stages, and wherein each block received at a first sequential stage of the at least three stages is sequentially processed through each stage of the at least three stages.

17. A non-transitory computer-readable medium including processor-executable instructions that, when executed by a processor, cause the processor to:
process a first block at a pipeline of a motion estimator to generate a first motion vector of the first block, wherein the first block is from a first block row of a plurality of block rows of a frame;
process a second block at the pipeline to generate a second motion vector of the second block, wherein the second block is from a second block row of the plurality of block rows of the frame, and wherein the second motion vector is generated subsequent to the first motion vector; and
process a third block at the pipeline to generate a third motion vector of the third block, wherein the third block is from the first block row, wherein the third motion vector is generated based on the first motion vector, and wherein the third motion vector is generated subsequent to the second motion vector.

18. The non-transitory computer-readable medium of claim 17, further comprising processor-executable instructions that, when executed by the processor, cause the processor to:
generate a motion vector predictor of the third block based on the first motion vector;
search, based at least in part on the motion vector predictor, for a prediction block to encode the third block;
generate a difference block indicative of differences between the third block to be encoded and the prediction block; and
output the third motion vector based on the prediction block.

19. The non-transitory computer-readable medium of claim 17, further comprising processor-executable instructions that, when executed by the processor, cause the processor to:
identify the motion vector to the third block by calculating distortion measure values that depend at least in part on the motion vector predictor, wherein the distortion measure values quantify a number of bits needed to encode different motion vectors; and
perform searches in stages at different spatial resolutions to identify the third motion vector to the third block.

20. An encoding device comprising:
means for processing a first block at a pipeline of a motion estimator to generate a first motion vector, wherein the first block is from a first block row of a plurality of block rows of a frame;
means for processing a second block at the pipeline to generate a second motion vector of the second block, wherein the second block is from a second block row of the plurality of block rows of the frame, and wherein the second motion vector is generated subsequent to the first motion vector; and
means for processing a third block at the pipeline to generate a third motion vector of the third block, where the third block is from the first block row, wherein the third motion vector is generated based on the first motion vector, and wherein the third motion vector is generated subsequent to the second motion vector.

21. The encoding device of claim 20, wherein the means for processing the third block further comprises:
   means for generating a motion vector predictor of the third block based on the first motion vector;
   means for searching for a prediction block to encode the third block, wherein at least part of a search for the prediction block is based on the motion vector predictor; and
   means for generating a difference block indicative of differences between the particular third block to be encoded and the prediction block.

22. The encoding device of claim 20, wherein the pipeline comprises three stages including a first stage, a second stage, and a third stage, and wherein the first stage includes a fetch engine, the second stage includes an integer search engine, and the third stage includes a fractional spatial search engine.

23. The encoding device of claim 12, wherein the pipeline includes a first stage, wherein the first stage includes a fetch engine that alternates between fetching a block from the first block row and the second block row on each execution cycle until a determination is made that the first block row and the second block row have been processed, and wherein each of the blocks represents a corresponding pixel array including a plurality of pixels.

24. The encoding device of claim 12, wherein the pipeline is a motion estimation pipeline configured to receive a particular block of the frame, determine a mode corresponding to the particular block, generate a particular motion vector predictor corresponding to the particular block, and generate a particular motion vector corresponding to the particular block.

25. The method of claim 1, further comprising:
   storing a portion of the frame at a block buffer, wherein the portion of the frame includes the first block row and the second block row;
   providing the motion vector predictor to a motion compensator; and
   selecting a mode to process the particular block, wherein the mode is selected as one of an inter-frame prediction mode, an intra-frame prediction mode, or a skip mode based on the motion vector predictor.

26. The method of claim 2, wherein the first block of the frame is positioned adjacent to the third block and on a same block row as the third block.

27. The method of claim 26, further comprising receiving the first block at a first stage of the pipeline at least two execution cycles prior to receiving the third block at the first stage of the pipeline.

28. The method of claim 2, wherein the motion vector predictor of the third block is generated based on a particular motion vector predictor of the first block and based on a mode decision of the first block, and wherein the third motion vector and the motion vector predictor are provided from the pipeline to a motion compensator as a third output of the motion estimator.

* * * * *